P. SAUVE.
DRILL OR TAP HOLDER.
APPLICATION FILED OCT. 2, 1919.
1,394,795. Patented Oct. 25, 1921.
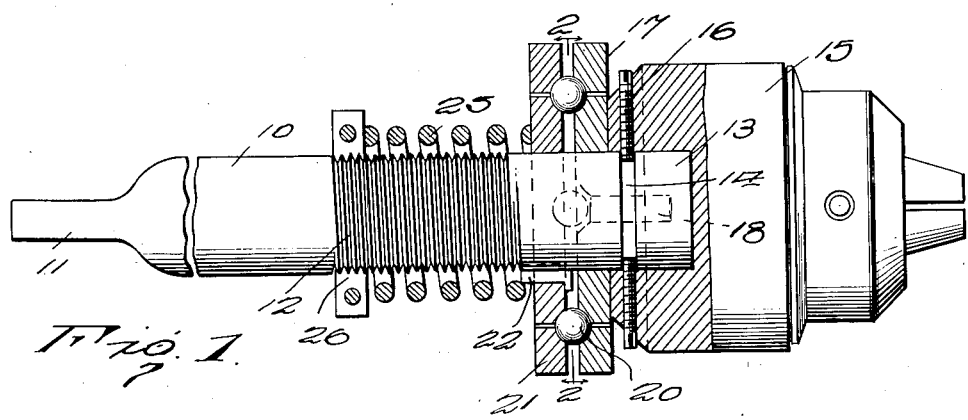
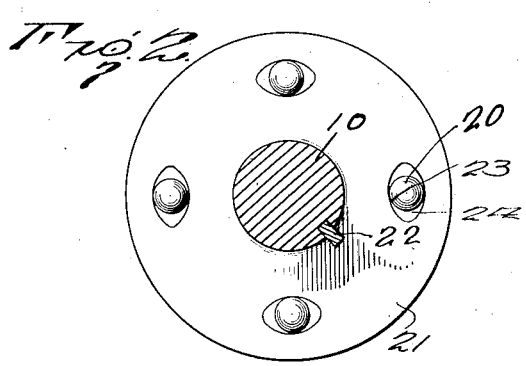
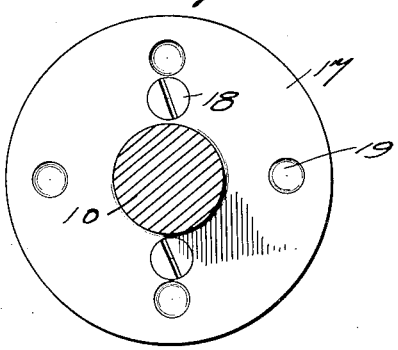
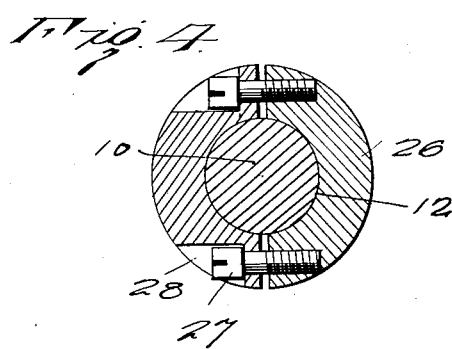
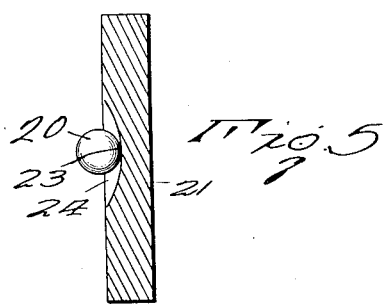
Inventor
Patrick Sauve
By H.S. Hill
Attorney

16
UNITED STATES PATENT OFFICE.

PATRICK SAUVE, OF FLINT, MICHIGAN.

DRILL OR TAP HOLDER.

1,394,795.  Specification of Letters Patent.  Patented Oct. 25, 1921.

Application filed October 2, 1919. Serial No. 327,902.

*To all whom it may concern:*

Be it known that I, PATRICK SAUVE, a citizen of the United States, residing at Flint, in the county of Genesee, State of Michigan, have invented a new and useful Drill or Tap Holder; and I do hereby declare the following to be a full, clear, and exact description of the invention, such as will enable others skilled in the art to which it appertains to make and use the same.

The present invention relates to a drill or tap holder, and has for an object to provide a holder which will automatically prevent the breaking of the drill or tap should the same meet with undue friction during operation or be otherwise held from turning.

Another object of the invention is to provide a relatively small and convenient device which may be handled in close places and which may be attached to the ordinary braces or other devices used for turning drills and taps and which is provided with the usual chuck or socket into which ordinary drills or taps may be secured.

Another object of the invention is to provide a device having a yieldable connection between the drill or tap carrying chuck and the shank which is attached to the turning means and to provide an adjustable means to vary the degree of pressure required for overcoming the tension of the yieldable connection.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a drill or tap holder constructed according to the present invention.

Fig. 2 is a transverse section on the line 2—2 of Fig. 1.

Fig. 3 is a similar section looking in the direction opposite to that shown in Fig. 2.

Fig. 4 is an enlarged transverse section through the holder showing the application of the adjusting means for varying the tension between the parts.

Fig. 5 is a fragmentary sectional view taken through one side of one of the yieldable elements showing the ball seat and cams therefor.

Corresponding and like parts are referred to in the following description and indicated in all of the views of the drawings by the same reference characters.

Referring to the drawing, 10 designates a shank which is provided with an angularly faced portion 11 adapted for connection with a suitable turning device, such as a brace or the like. The shank 10 has an intermediate screw threaded portion 12 and at its other end is provided with a bearing portion 13 having an annular groove 14 formed exteriorly therein in spaced relation to its extremity. A chuck 15, of the usual type, adapted to receive a drill bit or tap is fitted over the bearing portion 13 of the shank and is rotatably held by radially disposed screws or pins 16 adapted to enter the slot 14 at their inner ends.

A yieldable element 17, in the form of a disk, is mounted for rotation about the bearing portion 13 of the shank and is rigidly attached to the inner end of the chuck 15 by screws 18 or the like, as shown in Fig. 3. The disk 17 is provided with one or more ball seats 19 of substantially spherical formation and into which are seated one or more balls 20. A second yieldable element 21, in the form of a disk substantially of the diameter and size of the disk 17, is mounted on the shank 10 in spaced relation to the disk 17 and is secured to turn with the shank by a key 22 of suitable length to permit a slight longitudinal shifting of the disk 21 on the shank. As shown in Fig. 2, the disk 21 is provided with substantially spherical ball seats 23 corresponding in number and position to the seats 19 of the disk 17, the seats 19 and 23 being adapted to hold the balls 20 between the disks. The disk 21 is provided with cam faces or walls 24 at opposite sides of the seats 23 and in a circular alinement, the cam faces 23 extending from substantially the bases of the seats 23 to the outer surface of the disk 21. The shank 10 carries a preferably helical spring 25 which surrounds the intermediate and threaded portions of the shank with one end of the spring 25 bearing against the adjacent side of the disk 21, and the other end of the spring engaged by an adjustable collar 26 which is internally threaded and adapted to grip the threaded portion of the shank. The collar 26 is adjustable on the shank to vary the tension of the spring 25 against the disk 21.

As shown in Fig. 4, the adjusting collar 26 is preferably made in two parts and held together by a pair of clamping screws 27 which have their heads seated in recesses 28 in one part and have threaded engagement in the opposite part for the purpose of drawing the parts together upon the threaded portion of the shank after the collar 26 has been turned or otherwise adjusted into the desired position.

In operation, the shank 10 having been coupled to a suitable turning device, is rotated and the spring 25 is adjusted with sufficient tension to interlock the disks 17 and 21 together for turning the chuck 15 with the shank. The collar 26 is so positioned on the shank that when abnormal resistance is offered by the bit or tap carried by the chuck, the disk 21 is permitted to back up against the tension of the spring 25 and permit the balls 20 to roll outwardly over the cam faces 24 to free the balls of the seats 23 in the disk 21. The disk 21 will thus turn independently of the disk 20, which latter is permitted to remain at rest with the chuck 15 as the shank 10 is turned within the chuck. This device will also serve as an indication to the person operating the drill or tap that the bit has met resistance in operation and less pressure or other means may be resorted to for further carrying on the work.

As bits and taps of various sizes are used, the collar 26 may be quickly adjusted to meet the various conditions so that the tool or implement is adapted to all uses and will insure the protection against the breakage of the tap or drill.

The device comprises but few parts, is relatively small and occupies but little space and may be manipulated in small or confined spaces.

Having thus described the invention, what I claim as new and desire to secure by Letters Patent, is:—

1. In a device as specified, a shank, a chuck mounted to turn on the shank, a disk on the chuck, an opposed disk on the shank, said disks having corresponding ball seats formed in their adjacent faces and one disk having cam faces leading from the ball seats, one of the disks being rigid with the member to which it is applied while the other disk is keyed upon the other member, yielding means tending to move the keyed disk toward the first mentioned disk, and balls interposed between the disks and adapted to normally rest in the ball seats to interlock the disks for turning as a unit, said balls riding over the cam faces when undue resistance to turning is offered to one of the disks.

2. In a device as specified, a shank, a chuck mounted to turn on the shank, a disk on the chuck, a disk on the shank, adjustable means on the shank for urging the disk on the shank against the other disk, said disks having corresponding ball seats formed in their adjacent faces and one disk having cam faces leading from the ball seats, and balls interposed between the disks adapted to normally rest in said seats to interlock the disks for turning as a unit and adapted to ride over said cam faces when undue resistance to turning is offered one of the disks.

In testimony whereof I have signed my name to this specification in the presence of two subscribing witnesses.

PATRICK SAUVE.

Witnesses:
ROY W. SCHUMACHER,
MIKE TABIT.